L. H. ADKINS.
Animal-Trap.
No. 198,064.  Patented Dec. 11, 1877.
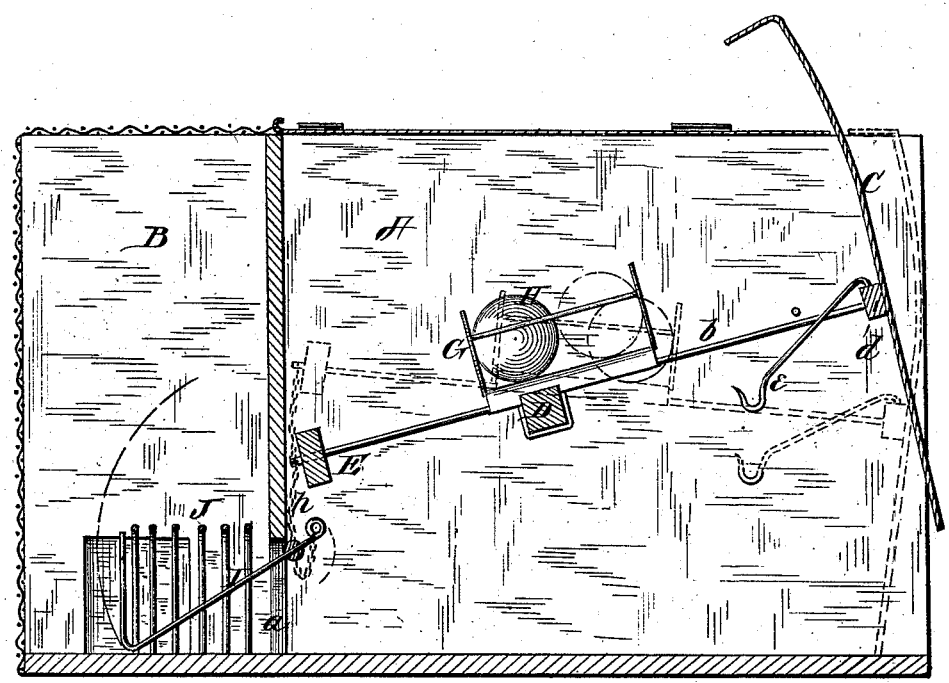
WITNESSES
INVENTOR
L. H. Adkins.
ATTORNEYS

UNITED STATES PATENT OFFICE.

LAWSON H. ADKINS, OF AMERICUS, GEORGIA.

IMPROVEMENT IN ANIMAL-TRAPS.

Specification forming part of Letters Patent No. 198,064, dated December 11, 1877; application filed October 11, 1877.

*To all whom it may concern:*

Be it known that I, LAWSON H. ADKINS, of Americus, in the county of Sumter, and in the State of Georgia, have invented certain new and useful Improvements in Animal-Traps; and do hereby declare that the following is a full, clear, and exact description thereof, reference being had to the accompanying drawings, and to the letters of reference marked thereon, making a part of this specification.

The nature of my invention consists in the construction and arrangement of an animal-trap, as will be hereinafter more fully set forth.

In order to enable others skilled in the art to which my invention appertains to make and use the same, I will now proceed to describe its construction and operation, referring to the annexed drawing, which represents a longitudinal section of my animal-trap.

A represents the trapping-chamber, connected at its rear by a passage, *a*, with the safety-chamber B. The front end *c* of the trap A forms a rising and falling door, and is, by means of wire arms *b b*, connected with a rocking bar, D, journaled in the sides of the trap at or near the center. The front ends of the wires *b* pass through a cross-bar, *d*, fastened on the inner side of the door C, and the extreme ends of said wires bent to form hook *e*, for the attachment of the bait.

Upon the rear ends of the wires or wire arms *b* is placed a weighted bar, E, which may be adjusted out and in on said arms, to properly balance the door C.

To the rocking bar D is attached a cage, G, extending at right angles on both sides of said bar, and containing a ball, H, which moves from end to end of the cage. The rear ends of the wire arms *b* are, by chains *h*, connected with arms projecting from a gate, I, hung in the passage *a* between the two chambers A and B. A suitable grating, J, is placed around the gate I within the chamber B.

The trap being set, as shown in the drawing, the animal enters the chamber A below the door C, and in attempting to take the bait from the hook or hooks *e* tilts the rocking bar D, in such a manner that the ball H will pass to the front end of the cage G, which closes the door C, preventing the escape of the animal. The chamber A being then dark, and the chamber B being constructed so as to admit light, the animal is attracted by the light through the passage *a*. When the door C is closed, the chain or chains *h* are held nearly taut; and when the animal, in passing through the passage *a*, raises the gate I, said chains *h* pull down the rear ends of the arms *b* sufficiently far to tilt the bar D and cause the ball H to roll to the rear end of the cage, thereby setting the door C again, while at the same time the gate I drops behind the animal, and confines it in the safety-chamber B. From this chamber the animal is removed in any convenient manner.

I am aware that it is not new in an animal-trap to have a ball rolling in a guide on a tilting shaft, to close the inlet and to reset the trap by the animal passing from the trapping into the safety chamber; hence I do not claim such, broadly, as my invention.

Having thus fully described my invention, what I claim as new, and desire to secure by Letters Patent, is—

The within-described improved animal-trap, consisting of the chambers A and B, tilting bar D, with arms *b b*, having at one end the sliding door C, and at the other end the adjustable balancing-weight E, the cage G, with ball H, and the door I, connected by chains *h* with the weighted ends of the arms *b*, all constructed and arranged to operate substantially as and for the purposes herein set forth.

In testimony that I claim the foregoing I have hereunto set my hand this 21st day of September, 1877.

L. H. ADKINS.

Witnesses:
G. W. CANNON,
S. H. HAWKINS.